July 2, 1929.  H. A. THOMPSON  1,719,346
FILTERING OR LIKE DEVICE
Filed Jan. 12, 1929  2 Sheets-Sheet 1

INVENTOR.
H. A. Thompson

July 2, 1929.  H. A. THOMPSON  1,719,346
FILTERING OR LIKE DEVICE
Filed Jan. 12, 1929   2 Sheets-Sheet 2
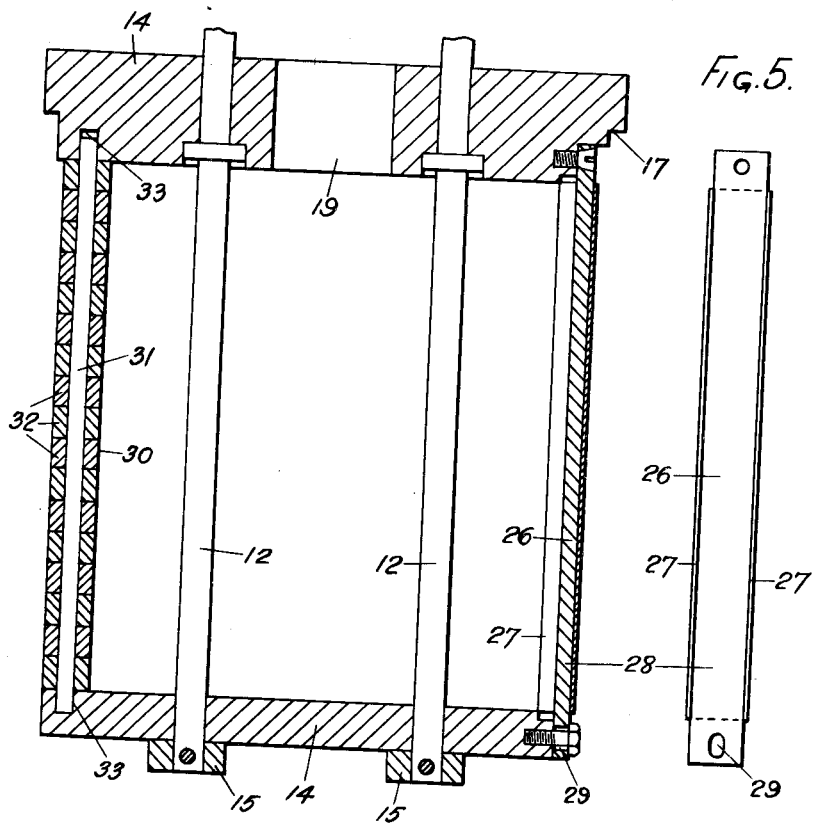
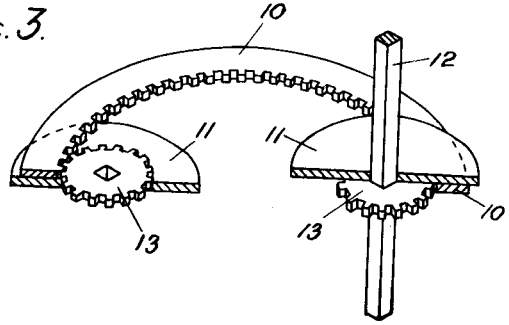
INVENTOR.
H.A. THOMPSON Patented July 2, 1929.

1,719,346

UNITED STATES PATENT OFFICE.

HERBERT ALEXANDER THOMPSON, OF MORPETH, ENGLAND, ASSIGNOR OF ONE-HALF TO SWINNEY BROTHERS LIMITED, OF MORPETH, ENGLAND, A CORPORATION OF GREAT BRITAIN.

FILTERING OR LIKE DEVICE.

Application filed January 12, 1929, Serial No. 332,077, and in Great Britain October 26, 1928.

This invention relates to filter and like devices, particularly for use in filtering oil. It is a continuation in part of my co-pending application Serial No. 332,076 filed concurrently herewith.

The primary object of the invention is to provide an improved and rugged filter.

A further object is to provide improved means for effecting synchronous rotation of the laminations and interposed scraper elements of the filter, whereby clogging will be avoided.

A further object is to provide a filter comprising spaced annular laminations rotatable about a common axis, scraper disks mounted on a spindle and extending into the spaces between the laminations, and means movable with the disks and engaging peripheral teeth provided on the laminations.

These and other objects will be better understood if attention be directed to the following description, in which reference is made to the accompanying drawings. These drawings merely show examples, however, and numerous modifications can be made in the design of my improved filter without departing from the spirit of my invention, the novel features of which are set out in the accompanying claims.

In the drawings:—

Fig. 3 is a part view in perspective showing one of the filtering laminations gearing with two scraper elements;

Fig. 4 is a sectional view of the end-plates of the laminated structure drawn to a slightly larger scale and showing a modified arrangement of the roller and fixed scraper shown in Fig. 2; and Fig. 5 is a front view of the fixed scraper of Fig. 4.

Figure 1:
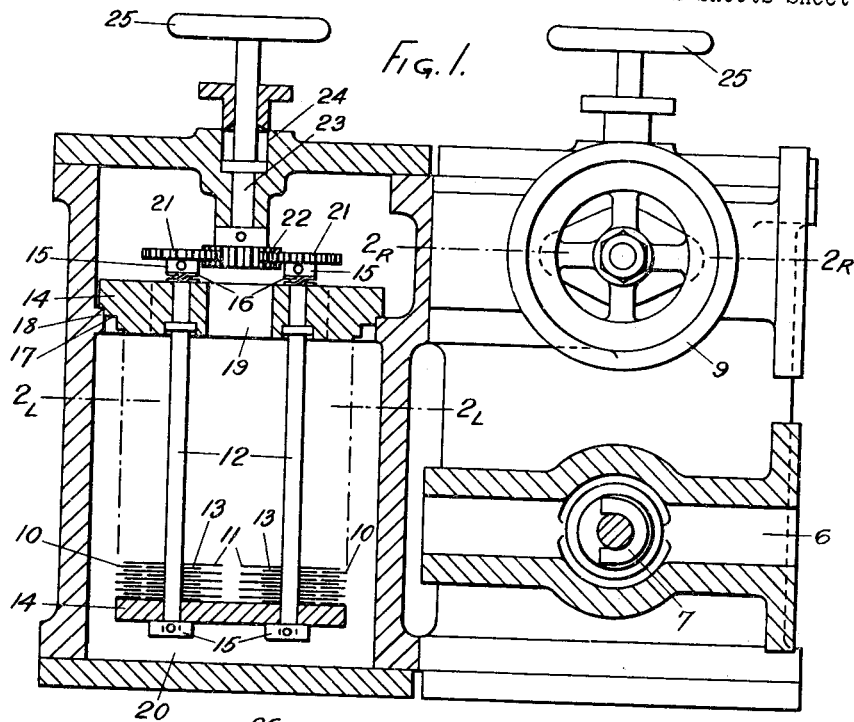
Fig. 1 is a part-sectional elevation of a duplex filter according to the invention, the left-hand portion of Fig. 1 being substantially a section about the line $1_L$—$1_L$ of Fig. 2, and the sectional part of the right-hand portion of Fig. 1 being taken on the line $1_R$—$1_R$ of Fig. 2.

The drawing shows an arrangement of two similar filters mounted side-by-side and provided with a common inlet passage 6 controlled by manually-operable valves 7 and a common outlet passage 8 controlled by other manually-operable valves 9, 9. When one of the filters is to be thrown out of commission its associated valves are closed, and filtering can then be carried on in the other filter, the valves therefor being opened. The casings for these filters may be formed separately and secured together, or they may be formed of integral castings.

Figure 2:
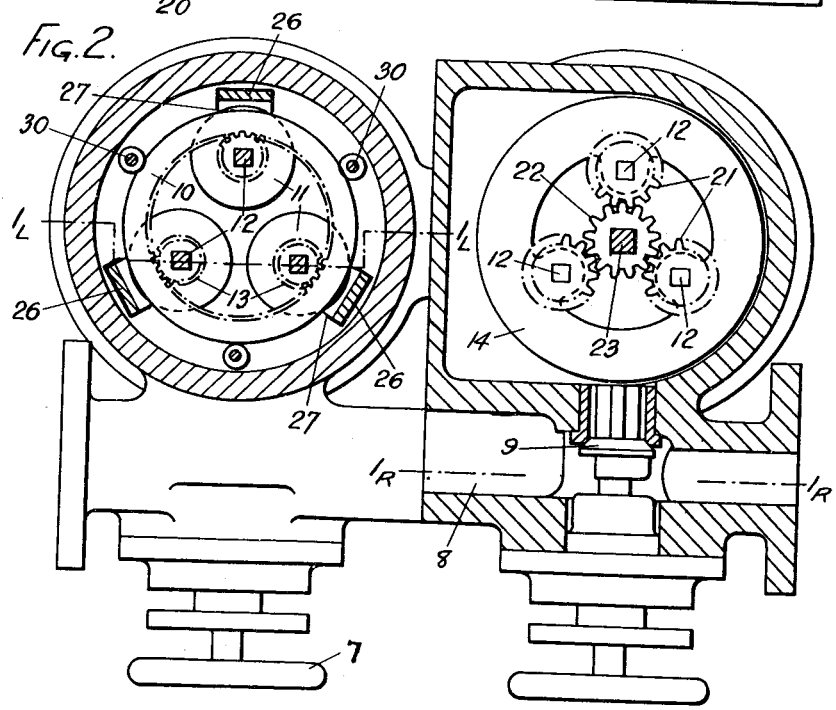
Fig. 2 is part-sectional plan view of the arrangement of Fig. 1, the sectional part of the left-hand side of Fig. 2 being taken on the line $2_L$—$2_L$ of Fig. 1 and the right-hand part of Fig. 2 being a section on the line $2_R$—$2_R$ of Fig. 1.

Each filter comprises a laminated structure formed of annular laminations 10, 10, arranged one above another and spaced by the scraper elements, which are here shown in the form of discs 11, 11, 11 mounted on spindles 12, 12 three such spindles, symmetrically disposed with respect to the main axis of the laminations, being illustrated in Fig. 2. The internal peripheries of the laminations are provided with teeth which mesh with the teeth of pinions 13, 13 secured to the scraper discs 11 or merely located between adjacent scraper discs. Discs 11 and pinions 13 are adapted to rotate with spindles 12, 12 which are shown as being of rectangular section for this purpose. The thickness of the pinions equals that of the laminations. The spindles 12, 12, 12 are journalled in the end assembly plates 14, 14, collars 15, 15, 15 being pinned on or otherwise secured to the spindles externally of the laminated structure. Spring washers 16, 16 are inserted between the top collars and the top assembly plate, these washers functioning to maintain the structure in a state of compression. The top assembly plate is peripherally stepped at 17 to enable it to be supported from the flange 18 around the filtering chamber.

With the arrangement thus far described, the oil to be filtered passes from passage 6 into the filtering chamber and then radially inward of the laminated structure, when it ascends axially and passes through the hole 19 in the upper assembly plate into the outlet passage 8. It will be evident that the outlet passage might be located below the inlet passage; and that the structure might be modified for radial outward flow, in which case the spindles 12, 12 and associated elements are located outside the annular laminations 10, 10 which are then provided with teeth on their external peripheries to engage with the pinions secured to the scraper discs.

Periodically, in order to keep the filter clean and efficient one of the shafts 12 can be turned (for which purpose the shafts could extend through the top casing), and the gearing is such that all the scraper discs of this filter will then be rotated about their respective axes, and the annular laminations will at the same time be rotated in unison in the same direction about their common axis, whereby any grit or other refuse sticking between the laminations will be cut away therefrom and thrust outwardly, when it will fall to the sump space 20 at the bottom of the chamber. In the present case, instead of any of the spindles 12, 12 extending through the top casing, they are shown with pinions 21, 21 fixed thereon and gearing with a central pinion 22 carried by a spindle 23 which is journalled at 24 in the top cover of the casing and provided with the operating wheel 25 outside the cover.

In the arrangement described, the laminations are maintained coaxial by means of the pinions 13, 13 on shafts 12, 12. Longitudinal C-like scrapers 26, 26 are arranged with the longitudinal edges of their blades 27 engaging the scraper discs 11, 11 and also the laminations 10, 10 as shown in Fig. 2. These scrapers of C-section have knife-like longitudinal edges which are presented externally of the laminations 10, 10 and on each side of the discs 11, 11 projecting beyond said laminations.

Figs. 4 and 5 indicate one of the scrapers in more detail, the same being shown secured to a bar 28 which is fixed at one end to the top assembly plate 14 and loosely connected at its other end to the bottom assembly plate, the screw or bolt hole 29 being elongated for this purpose, so that the spring washers 16 will not be prevented from functioning.

Further centreing may be provided by means of the longitudinal roller members 30, 30 disposed symmetrically of the laminated structure against the non-toothed peripheries of the annular laminations. In Fig. 4 the roller member 30 is shown as consisting of a rod 31 carrying rollers 32, 32 and having its ends housed in holes 33, 33 in the end assembly plates, the holes being deep enough to allow of relative movement of the assembly plates towards and away from one another.

In the case of a radial outflow arrangement instead of the inflow arrangement illustrated, the fixed scrapers 26 and roller elements 30 will be located within the central bore of the laminations.

What I claim as my invention, and desire to secure by Letters Patent is:—

1. In a filter device, the combination of a plurality of spaced and coaxial annular laminations, peripheral teeth on said laminations, a spindle having scraper elements fixed thereon, said spindle being parallel to said axis and said scraper elements being arranged to extend into the spaces between said laminations, and pinions coaxial with and adapted for movement with said scraper elements, said pinions gearing with said peripheral teeth.

2. In a filter device, the combination of a plurality of coaxial annular laminations spaced from one another to form a chamber, said laminations having peripheral teeth thereon, means closing one end of said chamber, a spindle having scraper disks fixed thereon, said scraper disks extending into the spaces between said laminations, and gear wheels on said spindle engaging said peripheral teeth to provide synchronous rotational movement of said laminations and disks.

3. In a filter device, the combination of a pluralty of coaxial annular laminations spaced from one another, peripheral teeth on said laminations, a plurality of spindles parallel to said axis and each having scraper elements fixed thereon, said scraper elements being arranged to extend into the spaces between said laminations, and pinions fixed on said spindles and gearing with said laminations to provide synchronous rotational movement thereof.

4. In a filter device, the combination of a plurality of coaxial annular laminations spaced from one another to form a chamber, peripheral teeth on said laminations, means closing one end of said chamber, a plurality of parallel spindles symmetrically disposed with respect to said axis and each having scraper disks fixed thereon, said scraper disks being arranged to extend into the spaces between said laminations, and means on said spindles gearing with said laminations to provide synchronous rotational movement thereof.

5. A filter device comprising a plurality of coaxial spaced annular laminations having peripheral teeth, said laminations forming a chamber, means closing one end of said chamber, a spindle having scraper disks fixed thereon, said scraper disks extending into the spaces between said laminations, gear wheels on said spindle adapted to engage said peripheral teeth, inlet and outlet passages, one of said passages leading to the exterior of said chamber and the other to the non-closed end of said chamber, and valve means for controlling the fluid-flow through said passages.

6. In a filter device, the combination of a plurality of similar, coaxial annular laminations equally-spaced from one another and forming a hollow chamber, each of said laminations having peripheral teeth thereon, means closing one end of said chamber, a plurality of similar coaxial disks arranged eccentrically of said chamber and extending into the spaces between said laminations, said disks each having a width substantially equal to the width of each of said spaces, means for effecting rotational movement of all of said disks, and gear wheels movable with said disks, each of said gear wheels engaging the teeth of one of said laminations.

7. In a filter device, the combination of a plurality of similar, coaxial annular laminations equally-spaced from one another and forming a hollow chamber, peripheral teeth internally of said laminations, means closing one end of said chamber, a plurality of similar coaxial disks arranged eccentrically within said chamber and extending into the spaces between said laminations, said disks each having a width substantially equal to the width of each of said spaces, means for effecting rotational movement of said disks, and coaxial gear wheels interposed between and movable with said disks, said gear wheels engaging the internal teeth of said laminations.

8. In a filter device, the combination of coaxial annular laminations spaced from one another and provided internally with teeth, parallel spindles disposed longitudinally within said laminations, said spindles being arranged symmetrically about said axis and each of said spindles carrying coaxial circular disks spaced along it and extending into the spaces between adjacent laminations, and gear-wheels fixed on said spindles in mesh with the internal teeth on said laminations.

9. In a filter device, the combination of spaced coaxial annular laminations adapted for rotational movement as a whole about the common axis, said laminations having peripheral teeth provided thereon, other spaced coaxial laminations adapted for rotational movement as a whole about their common axis, the latter laminations extending into the spaces between said first-mentioned laminations, gear wheels engaging said laminations, said gear wheels being adapted for movement as a whole about said second-mentioned axis, and fixed scraper means adapted to engage both groups of laminations.

10. In a filter device, the combination of a plurality of similar, coaxial annular laminations equally-spaced from one another and forming a hollow chamber, said laminations having teeth on their inside edges, means closing one end of said chamber, a plurality of similar coaxial disks arranged eccentrically of said chamber and extending into the spaces between said laminations, said disks each having a width substantially equal to the width of each of said spaces, and means for rotating each of said laminations in unison with said disks, said means comprising gear wheels movable as a whole with said disks and engaging the teeth on said laminations.

11. In a filter device, the combination of a cylindrical chamber built up of a plurality of coaxial annular laminations and closed at one end, said laminations having peripheral teeth formed thereon, a plurality of scraper disks positioned between each adjacent pair of said laminations and extending across the annular surfaces thereof, said scraper disks being arranged in groups and said groups being symmetrically disposed with respect to said laminations, a cage member surrounding said chamber, said cage member having longitudinal bars positioned externally of said laminations, and pinions movable with said disks and engaging said laminations.

12. In a filter device, the combination of a plurality of similar, coaxial annular laminations equally-spaced from one another and forming a hollow chamber, each of said laminations having peripheral teeth thereon, means closing one end of said chamber, a plurality of similar coaxial disks arranged eccentrically of said chamber and extending into the spaces betweeen said laminations, said disks each having a width substantially equal to the width of each of said spaces, means for effecting rotational movement of all of said disks, gear wheels movable with said disks, each of said gear wheels engaging the teeth of one of said laminations, and a fixed bar having a longitudinal knife-like edge engaging both said laminations and said disks.

13. In a filter device, the combination of a plurality of similar, coaxial annular laminations equally-spaced from one another and forming a hollow chamber, peripheral teeth internally of said laminations, means closing one end of said chamber, a plurality of similar coaxial disks arranged eccentrically within said chamber and extending into the spaces between said laminations, said disks each having a width substantially equal to the width of each of said spaces, means for effecting rotational movement of said disks, coaxial gear wheels interposed between and movable with said disks, said gear wheels engaging the internal teeth of said laminations, and a fixed scraper of C-section having knife-like edges presented externally of said laminations and on each side of the disks projecting beyond said laminations.

HERBERT ALEXANDER THOMPSON.